US012281499B2

(12) United States Patent
Kuchler

(10) Patent No.: US 12,281,499 B2
(45) Date of Patent: Apr. 22, 2025

(54) HOLDER FOR A PORTABLE LOCK

(71) Applicant: ABUS August Bremicker Söhne KG, Wetter-Volmarstein (DE)

(72) Inventor: Marcus Kuchler, Munich (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 585 days.

(21) Appl. No.: 17/341,634

(22) Filed: Jun. 8, 2021

(65) Prior Publication Data

US 2021/0396050 A1    Dec. 23, 2021

(30) Foreign Application Priority Data

Jun. 18, 2020   (DE) .......................... 102020116154.9

(51) Int. Cl.
*E05B 67/38*   (2006.01)
*E05B 37/02*   (2006.01)
*E05B 67/00*   (2006.01)

(52) U.S. Cl.
CPC ............ *E05B 67/38* (2013.01); *E05B 37/025* (2013.01); *E05B 67/006* (2013.01)

(58) Field of Classification Search
CPC ........ E05B 67/38; E05B 67/006; E05B 67/02; E05B 37/025; E05B 17/0025;

(Continued)

(56) References Cited

U.S. PATENT DOCUMENTS 4,528,998 A  *  7/1985  Gamm ..................... A61H 3/00
                                                    403/108
4,896,517 A  *  1/1990  Ling ..................... E05B 67/006
                                                    70/30

(Continued)

FOREIGN PATENT DOCUMENTS

CN        201534586 U      7/2010
CN        204452673 U      7/2015

(Continued)

OTHER PUBLICATIONS

Extended European Search Report regarding European Patent Application No. 21170512.4, dated Oct. 22, 2021.

(Continued)

*Primary Examiner* — Gilbert Y Lee
*Assistant Examiner* — Yahya Sidky
(74) *Attorney, Agent, or Firm* — Harness, Dickey & Pierce, P.L.C.

(57) ABSTRACT

A holder for a portable lock, which has a lock body having a locking mechanism and a spring-loaded button, has at least a first holding section and a second holding section that is disposed opposite the first holding section with respect to a reception space for the lock body, wherein the first and second holding sections are configured to engage around the lock body, when inserted into the holder along an introduction direction, at a first side and at a second side of the lock body that is disposed opposite the first side. The holder has, at least at the first holding section, a securing opening that is formed to take the button of the lock body into engagement in order hereby to secure the lock body against an unintentional release from the holder against the introduction direction.

7 Claims, 4 Drawing Sheets

(58) Field of Classification Search
CPC ........ E05B 17/002; E05B 17/14; E05B 17/18;
E05B 17/186; E05B 67/04; E05B
2067/386; Y10S 292/37; Y10T 292/0969;
Y10T 292/48
USPC ........................................................ 70/333 A
See application file for complete search history.

(56) References Cited

U.S. PATENT DOCUMENTS

| | | | |
|---|---|---|---|
| 5,156,028 A * | 10/1992 | Jiang .................... | E05B 67/006 |
| | | | 70/30 |
| 5,662,255 A | 9/1997 | Lu | |
| 6,467,316 B1 | 10/2002 | Chen | |
| 7,131,298 B1 | 11/2006 | Haraughty | |
| 7,712,339 B2 | 5/2010 | Hentschel et al. | |
| D657,657 S | 4/2012 | Golling | |
| D862,198 S | 10/2019 | Pietruck | |
| 11,319,730 B1 * | 5/2022 | Derman .................. | E05B 67/38 |
| 11,608,658 B1 * | 3/2023 | Derman .................. | E05B 67/38 |
| 2011/0041569 A1 | 2/2011 | Yu et al. | |
| 2014/0042201 A1 | 2/2014 | Weiershausen et al. | |
| 2016/0002958 A1 * | 1/2016 | Liu .................... | E05B 15/0053 |
| | | | 70/52 |
| 2016/0215527 A1 * | 7/2016 | Steinkamp .............. | E05B 67/38 |
| 2016/0368552 A1 * | 12/2016 | Heinemann .............. | B62J 11/00 |
| 2020/0231235 A1 | 7/2020 | Yang | |

FOREIGN PATENT DOCUMENTS

| | | |
|---|---|---|
| DE | 202004007927 U1 | 7/2004 |
| DE | 202005013390 U1 | 12/2006 |
| DE | 102013102009 A1 | 9/2013 |
| DE | 102013102010 A1 | 9/2013 |
| DE | 202014103690 U1 | 8/2014 |
| DE | 202015103108 U1 | 7/2015 |
| DE | 202019101823 U1 | 4/2019 |
| EP | 1249566 A2 | 10/2002 |
| EP | 2019178 B1 | 8/2013 |
| GB | 2414272 B | 10/2007 |
| JP | 2005179890 A | 7/2005 |
| TW | M509758 U | 10/2015 |
| TW | 201708021 A | 3/2017 |
| WO | WO-2017060004 A1 | 4/2017 |

OTHER PUBLICATIONS

German Search Report regarding German Application No. 102020116154.9 dated Jan. 27, 2021.

Chinese Office Action regarding Patent Application No. 202110678770.1, dated Aug. 12, 2024.

* cited by examiner

HOLDER FOR A PORTABLE LOCK

The present invention relates to a holder for a portable lock that has a lock body having a locking mechanism and a spring-loaded button. The holder has at least a first holding section and a second holding section that is disposed opposite the first holding section with respect to a reception space for the lock body, wherein the first and second holding sections are configured to engage around the lock body, when inserted into the holder along an introduction direction, at a first side of the lock body and at a second side of the lock body that is disposed opposite the first side. The invention further relates to a lock system comprising such a holder; and an associated lock.

In mobile applications, such a lock may serve to secure an object—for example, a two-wheeler, a piece of sports equipment, or a piece of luggage—at a stationary object or to immobilize the object. An associated holder serves to comfortably and securely take along the portable lock when not in use, that is while the lock is not required for its securing function. For this purpose, the first holding section and the second holding section of the holder may bound a reception space into which the lock may be inserted.

During a transport of the lock, for example during the ride with a two-wheeler, it is important that the lock inserted in the holder is not unintentionally released from the holder, for instance, due to vibrations. For example, a holder for a folding lock is known from DE 20 2005 013 390 U1 in which a tab may be placed over the lock inserted into the holder in order to secure the lock in the reception space of the holder.

It is an object to provide a holder for a portable lock of said kind in which the lock may be easily inserted into the holder and the lock is reliably secured in the holder when not in use.

This object is satisfied by a holder having the features of claim 1, and in particular in that the holder has, at least at the first holding section, a securing opening that is formed to take the spring-loaded button of the lock body into engagement in order hereby to secure the lock body against an unintentional release from the holder against the introduction direction.

Such a holder may engage around the lock body of a portable or mobile lock, whereby the lock is at least fixed in a lateral direction in a reception space of the holder that is bounded by two holding sections of the holder. The lock body may be inserted into this reception space along an introduction direction. In addition, the holder secures the lock body against an unintentional release against the introduction direction in that the holder has a securing opening, into which a spring-loaded button of the lock body engages, at least at one of the holding sections. Since the securing opening is provided at one of the holding sections of the holder that engage around the lock body at two mutually opposed sides (in particular without clearance), the engagement of the button into the securing opening may bring about a reliable fixing of the lock body even with a small actuation stroke of the button (spacing between the pressed-in position and the extended position of the button).

Thus, a button provided at the lock body is used to secure the lock in the holder when not in use. The spring-loaded button may, for example, be provided at the lock body to actuate the locking mechanism and/or to actuate a closing hoop of the lock.

In order again to be able to remove the lock body from the holder against the introduction direction, the button of the lock body merely has to be briefly pressed and thus has to be brought out of engagement with the securing opening of the holder.

Accordingly, the holder makes it possible to insert a portable lock of said kind into the holder with a simple handling, to reliably secure it in the holder, and to be able to release it from the holder again with a simple handling.

The invention further relates to the use of a holder of the explained kind for securely holding a portable lock that has a lock body having a locking mechanism and a spring-loaded button.

Different embodiments will be explained in the following.

The securing opening of the holder for the button of the lock body may be circumferentially closed. The securing opening may in particular be configured to engage around the button in a form-fitted manner. However, this is not absolutely necessary. It is above all important that a boundary of the securing opening forms an abutment that blocks the extended button against a movement against the introduction direction. The boundary of the securing opening disposed against the introduction direction may in particular form an offset edge to prevent the extended button from moving against the introduction direction.

In some embodiments, the holder may be circumferentially open, wherein the holder in particular engages around the lock body at three sides (in a normal plane to the introduction direction). For example, the holder may be U-shaped or C-shaped in cross-section.

In other embodiments, the holder may engage around the lock body in a circumferentially closed manner. For example, the holder may be rectangular, oval or O-shaped in cross-section.

In some embodiments, the holder may have a further securing opening at the second holding section, wherein the two holding sections and the two securing openings are provided in an arrangement that is rotationally symmetrical by 180 degrees to be able to selectively receive and secure the lock body in one of two possible orientations. A particularly simple handling is hereby possible since the user may insert the lock body into the holder in one of two possible orientations (with respect to a rotation about an axis that corresponds to the introduction direction) without having to pay attention to the position of the button.

In some embodiments, the holder may have, at its end facing against the introduction direction, an introduction slope that forms a cross-sectional widening of the holder to facilitate the introduction of the lock body into the holder and/or to bring about an urging back of the button when introducing the lock body into the holder. An introduction slope may in particular be provided in at least one angular region that corresponds to the position of the button at the lock body. Such an introduction slope may serve to temporarily urge back the spring-loaded button against its spring preload during the insertion of the lock body into the reception space of the holder so that no additional manual actuation of the button is required and the button may automatically snap into the securing opening due to its spring preload on the reaching of the securing opening.

In some embodiments, the holder may be open in and against the introduction direction, wherein the first holding section and the second holding section bound a substantially constant cross-section of the reception space for the lock body so that the lock body is secured against an unintentional release from the holder in and against the introduction direction solely by the engagement of the button of the lock body into the securing opening.

In other embodiments, the holder may be formed as conically converging along the introduction direction to limit an introduction depth of the lock body inserted into the holder. Alternatively or additionally, the holder may have a support section disposed in the introduction direction (for example, a closed base or a partly open base section) to support the lock body inserted into the holder with respect to the introduction direction.

In some embodiments, the holder may have a fastening section comprising a fastening passage which extends transversely to the introduction direction and through which a fastening band for fastening the holder to an object, in particular to a tube section of a two-wheeler, may be led. The fastening section may in particular be provided outside the reception space for the lock body. Alternatively or additionally, the holder may have two fastening openings through which a respective fastening screw for fastening the holder to an object, in particular to a tube section of a two-wheeler, may be led. The fastening openings may in particular correspond to the typical spacing of the threaded bores of a two-wheeler frame for a bottle holder. The holder may thus be fastened in a simple manner to an object, in particular to a tube section of a two-wheeler.

The invention further relates to a lock system comprising a holder of the explained kind; and a lock that has a lock body having a locking mechanism and a spring-loaded button.

The spring-loaded button may project over the lock body in a position of rest or in an extended state. A reliable engagement into the securing opening of the holder is hereby possible.

In some embodiments, the button may be preloaded against an actuation direction. In this respect, the button may project over a side surface of the lock body along the actuation direction and/or the button may define a maximum width of the lock body along the actuation direction. The direction of actuation may extend transversely, in particular perpendicular, to the introduction direction.

As a result of the insertion of the lock into the reception space of the holder, the spring-loaded button may in particular automatically snap into the securing opening on the reaching of the securing opening of the holder.

In some embodiments, the locking mechanism may comprise a combination locking mechanism, wherein the button may only be actuated to bring the button out of engagement with the securing opening of the holder when a secret code is set at the combination locking mechanism. The lock may hereby be indirectly secured (via the button) against an unauthorized removal from the holder. The combination locking mechanism may have a plurality of code setting rings rotatable about an axis of rotation.

In some embodiments, the lock may have a flexible or rigid closing hoop comprising at least one free end that is lockable to the lock body to form a closed loop. For example, the closing hoop may comprise a wire rope, a rigid hoop (in particular of U shape), a jointed bar hoop, or a chain. The closing hoop may have a variable length or a fixed length.

For example, the spring-loaded button of the lock body may serve to move the locking mechanism into a release position or into a locked position or to release, block, or otherwise control the closing hoop for a movement relative to the lock body. The spring-loaded button of the lock body may also serve for the control of the locking mechanism or for another function in an electronic portable lock (e.g. a portable two-wheeler lock having an electric motor for an electromechanical locking mechanism).

The present disclosure will be explained only by way of example in the following with reference to the drawings.

Figure 1:
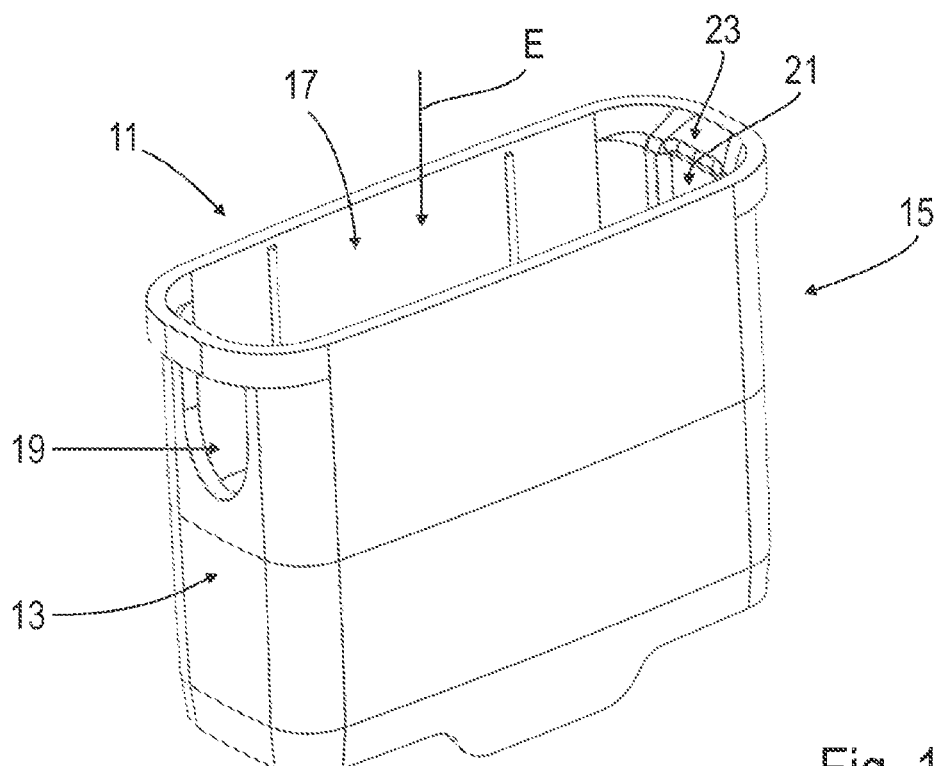
FIGS. 1 to 4 show a perspective view from the top left, a perspective view from the bottom right, a side view from the right, and a plan view of a holder.
Figure 2:
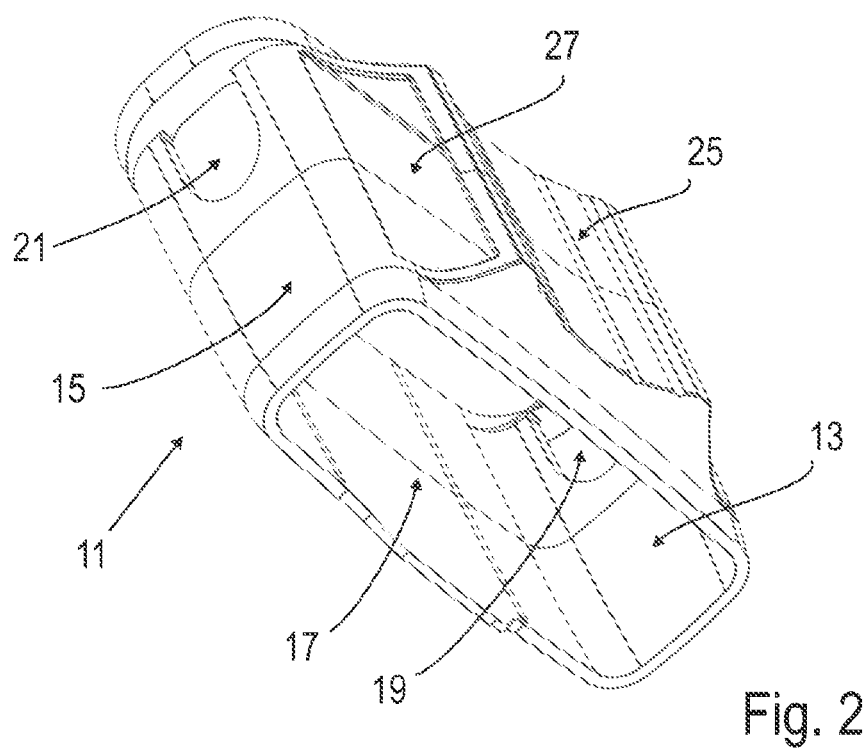
Figure 3:
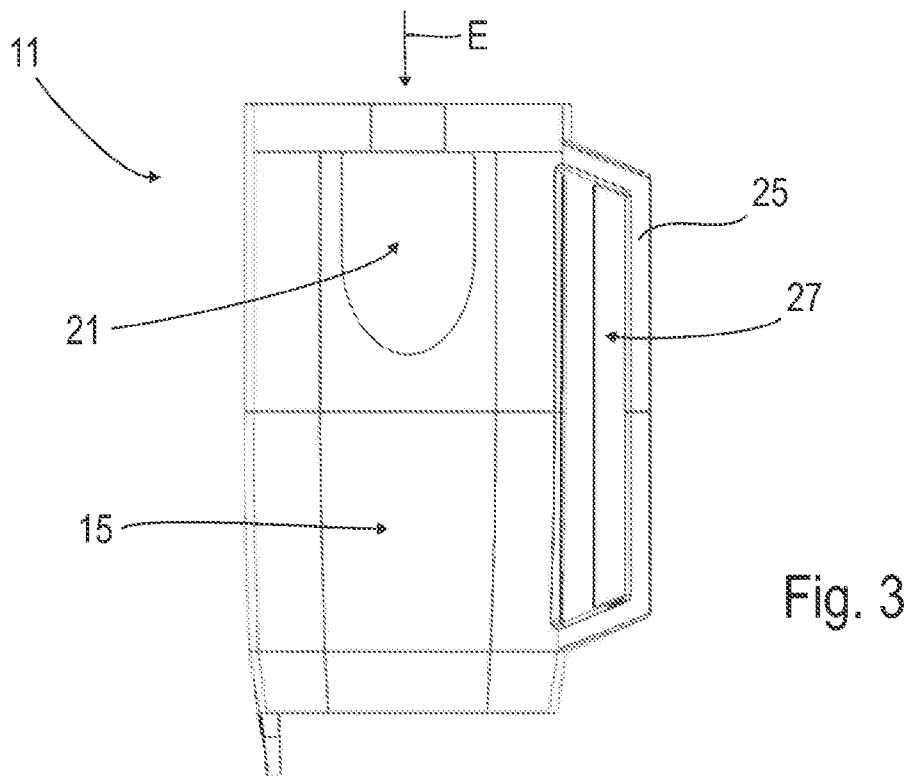
Figure 4:
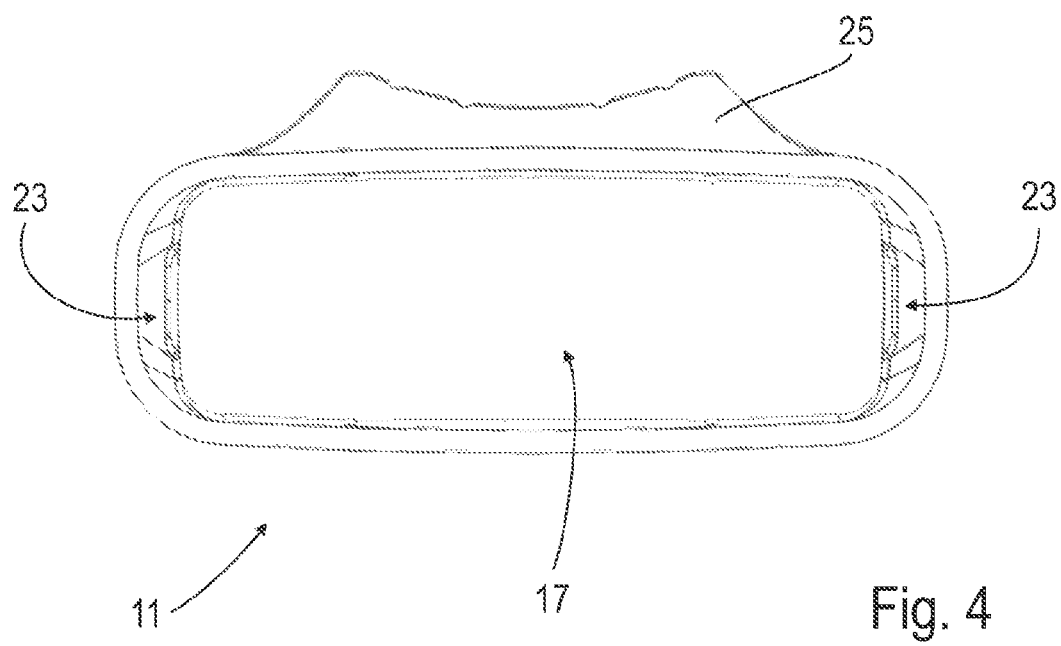
Figure 5:
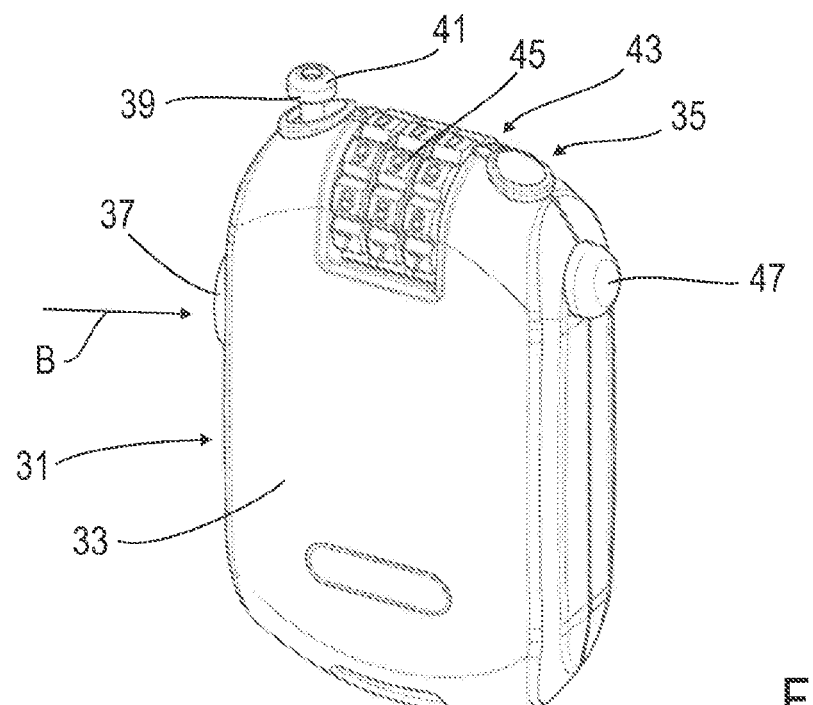
FIGS. 5 and 6 show a portable lock that may be held and transported by means of the holder in accordance with FIGS. 1 to 4.
Figure 6:
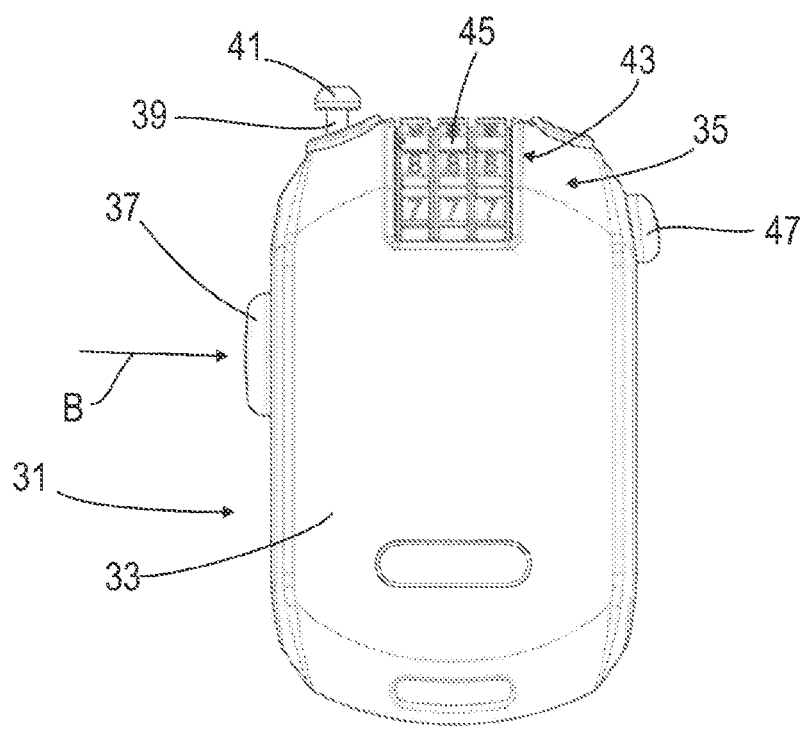

FIGS. 1 to 4 show a holder 11 for a temporary holding of a lock 31 of, for example, the kind shown in FIGS. 5 and 6 that may be inserted into the holder 11 along an introduction direction E. Such a lock 31 has a lock body 33 having a locking mechanism 35 and a spring-loaded button 37. Due to its preload, the button 37 projects over a side surface of the lock body 33 in a position of rest and may be pressed against the preload along an actuation direction B, which extends transversely to the introduction direction E, in the direction of the lock body 33. Furthermore, such a lock 31 may have a closing hoop 39 that may be locked to the lock body 33 by means of the locking mechanism 35 in a closed position and that may be moved into an open position, in which at least one end of the closing hoop 39 may be released from the lock body 33, in a release position of the locking mechanism 35.

In the embodiment in accordance with FIGS. 5 and 6, the closing hoop 39 is configured as a wire rope that may be pulled out of the lock body 33 against a spring force and that has, at its free end, a bolt 41 that is lockable to the lock body 33, as is known from US D862198 S or U.S. Pat. No. 4,896,517, for example. The locking mechanism 35 has a combination locking mechanism 43 having a plurality of rotatable code setting rings 45. Here, the spring-loaded button 37 serves to pull the closing hoop 39 back into the lock body 33 by means of a spring force. A further spring-loaded button 47 of the lock body 33 serves for the displacement of the locking mechanism 35 into a release position. Both buttons 37, 47 may only be actuated when the secret code is set at the code setting rings 45.

The holder 11 is generally sleeve-shaped, having a circumferentially closed, substantially rectangular cross-section (with rounded corners) and having open ends in and against the introduction direction E. The holder 11 has a first holding section 13 and a second holding section 15 that is disposed diametrically opposite the first holding section 13 with respect to a reception space 17 for the lock body 33. The first and second holding sections 13, 15 are configured to engage substantially without clearance around the lock body 33, which is inserted along the introduction direction E into the reception space 17, at two mutually opposed sides of the lock body 33 with respect to the actuation direction B. At the two holding sections 13, 15, the holder 11 has a respective securing opening 19, 21 that is formed to take the spring-loaded button 37 of the lock body 33 into a form-fitted engagement in its position of rest projecting from the lock body 33 in order hereby to secure the lock body 33 against an unintentional release from the holder 11 against the introduction direction E.

At its end disposed against the introduction direction E, the holder 11 has two introduction slopes 23 in each case in an angular region corresponding to the securing openings 19, 21 (with respect to the introduction direction E). At its rear side, the holder 11 has a fastening section 25 having a fastening passage 27 which extends transversely to the introduction direction E and through which a fastening band (not shown) for fastening the holder 11 to a tube section of a two-wheeler may be led.

Thus, the spring-loaded button 37 of the lock body 33 is used to secure the lock 31 in the holder 11 when not in use. Alternatively, button 47 could also be used for this purpose (with a corresponding position and shape of the securing openings 19, 21). In order again to be able to remove the lock body 33 from the holder 11 against the introduction direction E, the button 37 or 47 of the lock body 33 merely has to be briefly pressed and thus has to be brought out of engagement with the securing opening 19, 21 of the holder 11.

Figure 7:
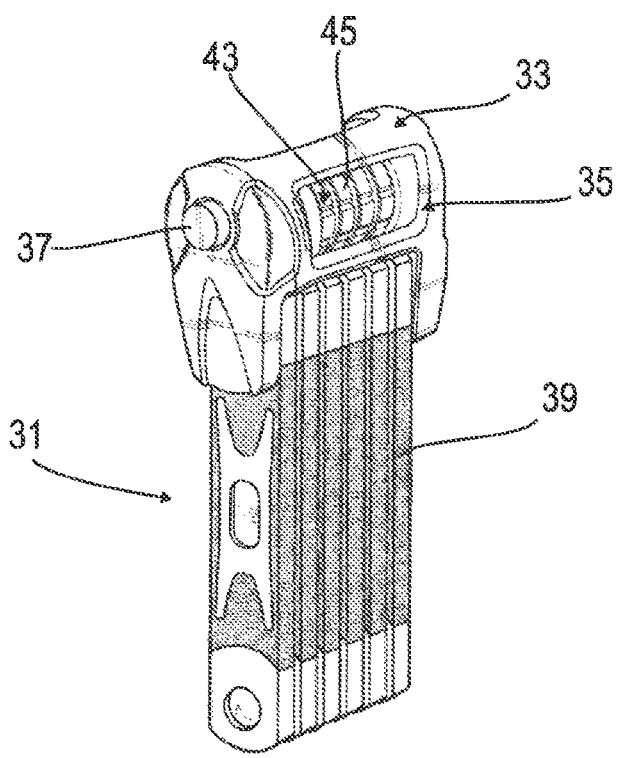
FIGS. 7 and 8 show a further portable lock.
Figure 8:
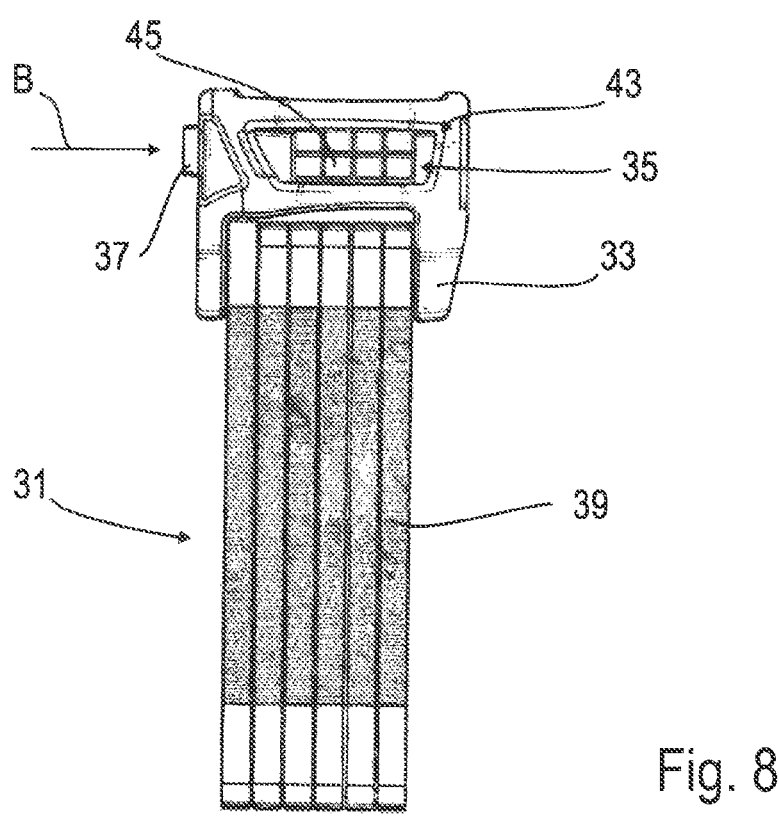

FIGS. 7 and 8 show a further portable lock 31 that has a lock body 33 having a locking mechanism 35 and a spring-loaded button 37 for actuating the locking mechanism 35, as is known from US D657657 S or EP 2019178 B1, for example. Such a lock 31 is also designated as a folding lock or a jointed bar lock and has a flexible closing hoop in the form of a jointed bar hoop. A similar holder 11 as shown in FIGS. 1 to 4 (with an adapted cross-sectional shape) may receive the lock in accordance with FIGS. 7 and 8, wherein the button 37 is used to secure the lock 31 in the holder 11 by an engagement into one of the securing openings 19, 21.

REFERENCE NUMERAL LIST 11 holder
13 holding section
15 holding section
17 reception space
19 securing opening
21 securing opening
23 introduction slope
25 fastening section
27 fastening passage
31 lock
33 lock body
35 locking mechanism
37 button
39 closing hoop
41 bolt
43 combination locking mechanism
45 code setting rings
47 button
B actuation direction
E introduction direction

The invention claimed is:

1. A lock system comprising a holder and a lock that has a lock body having a locking mechanism, a spring, and a spring-loaded button for actuating the locking mechanism,
wherein the holder has at least a first holding section and a second holding section that is disposed opposite the first holding section with respect to a reception space for the lock body, wherein the first and second holding sections are configured to engage around the lock body, when the lock body is inserted into the holder along an introduction direction, at a first side and at a second side of the lock body that is disposed opposite the first side,
wherein the holder has, at least at the first holding section, a securing opening that is formed to take the spring-loaded button of the lock body into engagement in order hereby to secure the lock body against an unintentional release from the holder against the introduction direction,
wherein the lock includes a closing hoop having at least one end that may be selectively fixed to and released from the lock body, the closing hoop being separate and spaced apart from the spring.

2. The lock system in accordance with claim 1 wherein the spring-loaded button projects over the lock body in a position of rest.

3. The lock system in accordance with claim 1, wherein the spring-loaded button is preloaded against an actuation direction, wherein the spring-loaded button projects over a side surface of the lock body along the actuation direction.

4. The lock system in accordance with claim 1, wherein the spring-loaded button is preloaded against an actuation direction, wherein the spring-loaded button defines a maximum width of the lock body along the actuation direction.

5. A lock system comprising a holder and a lock that has a lock body having a locking mechanism and a spring-loaded button for actuating the locking mechanism,
wherein the holder has at least a first holding section and a second holding section that is disposed opposite the first holding section with respect to a reception space for the lock body, wherein the first and second holding sections are configured to engage around the lock body, when the lock body is inserted into the holder along an introduction direction, at a first side and at a second side of the lock body that is disposed opposite the first side,
wherein the holder has, at least at the first holding section, a securing opening that is formed to take the spring-loaded button of the lock body into engagement in order hereby to secure the lock body against an unintentional release from the holder against the introduction direction,
wherein the locking mechanism comprises a combination locking mechanism which is configured such that the spring-loaded button can only be actuated to bring the spring-loaded button out of engagement with the securing opening of the holder when a secret code is set at the combination locking mechanism.

6. The lock system in accordance with claim 5,
wherein the lock has a flexible or rigid closing hoop comprising at least one free end that is lockable to the lock body.

7. A lock system comprising a holder and a lock that has a lock body having a locking mechanism and a spring-loaded button for actuating the locking mechanism, p1 wherein the holder has at least a first holding section and a second holding section that is disposed opposite the first holding section with respect to a reception space for the lock body, wherein the first and second holding sections are configured to engage around the lock body, when the lock body is inserted into the holder along an introduction direction, at a first side and at a second side of the lock body that is disposed opposite the first side,
wherein the holder has, at least at the first holding section, a securing opening that is formed to take the spring-loaded button of the lock body into engagement in order hereby to secure the lock body against an unintentional release from the holder against the introduction direction,
wherein the lock includes a closing hoop having at least one end that may be selectively fixed to and released from the lock body,
wherein the locking mechanism comprises a combination locking mechanism which comprises a plurality of code setting rings rotatable about an axis of rotation, wherein the combination locking mechanism selectively locks the at least one end of the closing hoop to the lock body or releases the at least one end of the closing hoop from the lock body.

\* \* \* \* \*